Nov. 18, 1952     E. D. ALEMAN ET AL     2,618,541
FUEL HOMOGENIZER
Filed Nov. 22, 1949
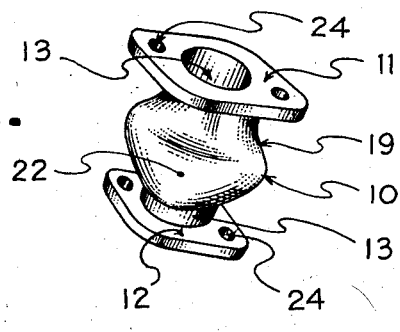
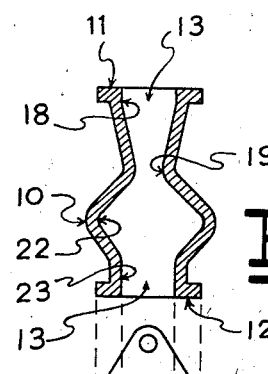
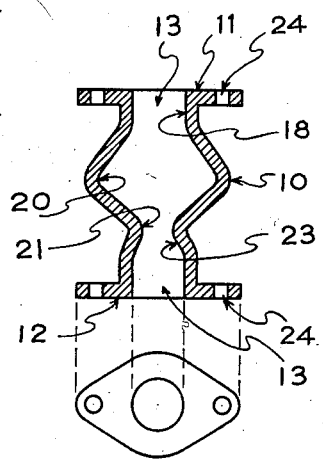
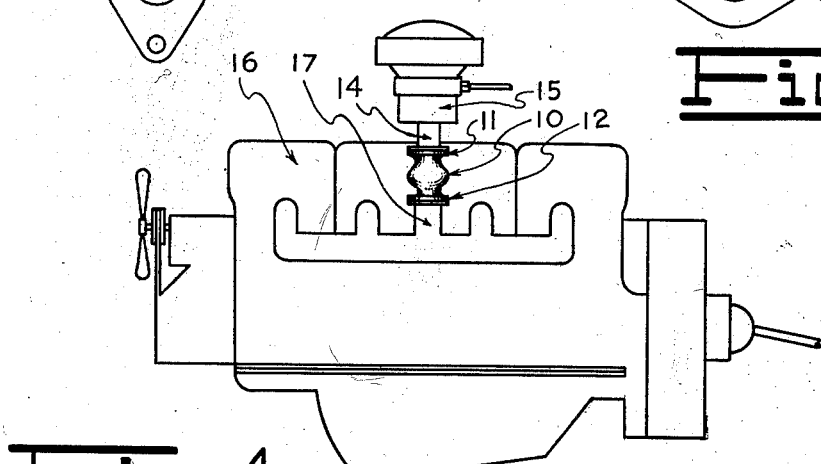
INVENTORS
EUGENIO D. ALEMAN
GUILLERMO S. VALDEZ
BY
ATTY.

Patented Nov. 18, 1952

2,618,541

UNITED STATES PATENT OFFICE 2,618,541

FUEL HOMOGENIZER

Eugenio D. Aleman and Guillermo Simo Valdez, Mixcoac, Mexico City, Mexico

Application November 22, 1949, Serial No. 128,876
In Mexico December 3, 1948

3 Claims. (Cl. 48—180)

In general, this invention has to do with devices used to improve the performance of internal combustion engines by means of a better utilization of the fuel, and, in particular, this invention consists of a well designed device that improves the diffusion of the vaporized fuel into the air, homogenizing this mixture better than without the use of this device, when such mixture goes directly from the carburetor through the inlet manifold to the cylinders of the internal combustion engines.

The invention consists of a duct of a special shape placed between the outlet of the carburetor and the entrance of the inlet manifold of the engine, in such a way that the explosive mixture goes through this duct on its way to the cylinders of an internal combustion engine. Due to the special shape of the inside of this device of our invention, which will be described in detail later on, the mixture of vaporized fuel and air in passing through it, is intimately homogenized, with the following results:

(a) Possibility of reducing the air excess with the result of an increase in explosive temperatures and hence, greater pressures, obtaining a cycle of greater efficiency (b) The obtainment of an explosive mixture of greater combustion speed, resulting in a cycle that approaches more in shape to the theoretical Otto cycle and, therefore, a cycle of greater area and, consequently, of greater efficiency (c) Reduces the carbon deposit tendency on engine, spark plugs and valves (d) Less advance of the ignition time, with results similar to those of "b"

(e) Evenness of the torque, or motor couple, and, hence, reduction of vibrations due to the fact that in any given period of admission each one of the cylinders receive the mixture of fuel and air in identical proportions We consider it is convenient to mention the great advantage that this invention has over all other methods used to date, in order to obtain the results produced by our invention. This advantage consists in that, in this invention, no complicated elements are required, nor is it necessary to introduce chemical substances in the mixture. It consists only of a very simple device, without moving parts, which, when once installed, requires neither special care, nor maintenance expenses. Furthermore, the definite adoption by engine manufacturers can be done in a very simple way, which consists in making the outlet of the carburetor or the entrance of the inlet manifold with the special shape which is characteristic of the device of the invention. The important fact is that the duct between the carburetor and the inlet manifold has the special shape which characterizes the device of our invention.

The characteristic details of the invention are clearly shown in the following description and in the drawings attached hereto.

In the drawings:

Fig. 1 is a perspective of the fitting of our invention, as seen from a tilted position.

Figs. 2 and 3 are longitudinal sections of the same device. These two sections are 90° cuts with respect to each other.

Fig. 4 is an elevation of the outline of an internal combustion engine to which the device of the invention has been adapted, in order to show the exact location of the device.

As shown in the attached drawings, the homogenizing device of the invention is constituted by a duct 10, which has, at its ends, two flanges 11 and 12, with centrally disposed circular orifices 13—13', respectively. As the flange 11 of this device is attached to the flange of the outlet 14 of the carburetor 15, it must have the same shape or cross-section. The same applies to the flange 12 which is attached to the flange of the inlet manifold 17 of the engine 16. The flanges 11 and 12 have bolt holes 2 to facilitate their respective connection to the carburetor and the inlet manifold.

The duct 10 has a special inside shape which produces the homogenization of the mixture of fuel and air coming from the carburetor.

The shape of the device 10 from the entrance to the outlet, is as follows: from the inlet orifice 13 the section is circular for a short length 18; it then gradually narrows along one of its transverse axes at 19 and widens along the other transverse axes at 20, the transverse axes being perpendicular to each other and to the longitudinal axis of the duct. This deformation provides the duct with an elliptical or other elongated section. It then has a similar deformation but disposed at 90° with respect to the deformation 19—20, the device being again narrowed along one axis at 21 and at the same time it widens along the transverse axis at 22. This deformation 21—22 blends into a short cylindrical portion 23 that extends to the outlet orifice 13'. In a sense, the duct 10 is the equivalent of a cylindrical tube that is pinched transversely at two spaced points, the pinches being disposed at right angles to each other.

Theory

The mixture of the atomized fuel and air, which due to the suction of the engine in operation, comes from the carburetor, is far from being homogenous. Under these conditions, such mixture reaches the cylinders with some streaks of vapors of fuel with very little or no air, in variable amounts, and portions of streaks of air with very little or no fuel. This brings about an imperfect and unequal combustion in each of the cylinders. However, if, instead of supplying the imperfect mixture directly from the carburetor to the cylinders, it is passed through the homogenizer of our invention, the mixture is forced to pass, in its path, through a plurality of sections which are reduced in one direction and enlarged in the other and which are disposed 90° apart. The passage of the fluid through these sections causes it to expand and contract repeatedly and in opposite sense so that it is thoroughly mixed and a perfect diffusion of the fuel and the air is obtained. Under these conditions all the cylinders will receive a mixture that is homogeneous and of equal or other proper proportions of fuel and air, with the results set forth in the a–b–c–d– and e items of the foregoing explanation.

Having thus described the invention, what we consider as new and desire to secure by Letters Patent is:

1. A device for homogenizing the fuel mixture for an internal combustion engine, comprising a duct to be interposed between the carburetor and the intake manifold of an engine, said duct having a passage which is circular in cross-section at each end and has a pair of elongated cross-sections in its mid-portion, the direction of elongation of one of said pair of cross-sections being substantially at right angles to the direction of elongation of the other of said pair of cross-sections, said directions of elongation of said pair of elongated cross-sections being substantially normal to the axis of said duct passage.

2. A device for homogenizing the fuel mixture for an internal combustion engine, comprising a duct fitting adapted to be interposed between the carburetor and the intake manifold of an engine, said fitting including a duct portion having perpendicular flanges at each end for respective connection to the carburetor and the intake manifold, said duct portion being circular in cross-section at each end and having a pair of elongated cross-sections in its mid-portion, the direction of elongation of one of said pair of cross-sections being substantially at right angles to the direction of elongation of the other of said pair of cross-sections, said directions of elongation of said pair of elongated cross-sections being substantially normal to the axis of said duct portion.

3. In combination with an internal combustion engine including a carburetor and an intake manifold, a fuel homogenizing duct between said carburetor and said intake manifold, said duct being circular in cross-section at each end and having a pair of elongated cross-sections in its mid-portion, the direction of elongation of one of said pair of cross-sections being substantially at right angles to the direction of elongation of the other of said pair of cross-sections, said directions of elongation of said pair of elongated cross-sections being substantially normal to the axis of said duct.

EUGENIO D. ALEMAN.
GUILLERMO SIMO VALDEZ.

REFERENCES CITED

The following references are of record in the file of this patent:

FOREIGN PATENTS

| Number | Country | Date |
|---|---|---|
| 639,205 | France | Mar. 6, 1928 |